DERIVING A CONTINUOUS WAVE SIGNAL

Filed Jan. 5, 1965

WITNESSES:
Bernard R. Gieguey
James F. Young

INVENTOR
Charles B. Heffron
BY
Samuel Otti 3,412,201
Patented Nov. 19, 1968

3,412,201

DERIVING A CONTINUOUS WAVE SIGNAL

Charles B. Heffron, Metuchen, N.J., assignor to Westinghouse Electric Corporation, East Pittsburgh, Pa., a corporation of Pennsylvania Filed Jan. 5, 1965, Ser. No. 423,543
9 Claims. (Cl. 178—5.4)

ABSTRACT OF THE DISCLOSURE

The present disclosure relates to a reconstructor circuit for use in a color television receiver for providing a continuous wave from color burst signals which are spaced from each other a predetermined time period. Color burst signals are applied to a delay line having reference points thereon, with the time period required for the signal to travel from one reference point to another being at least equal to the predetermined time period. The output of the delay line is a continuous wave signal derived from the individual color burst signals which is applied to a color demodulator of the receiver.

The present invention relates to an electronic generator, and more particularly to a generator for reconstructing a continuous waveform from spaced pulses of a continuous waveform.

In a standard color television receiver, it is necessary that demodulating reference signals be generated which have accurately maintained phase with respect to the phases of the chrominance signal. In order to make the generation of such accurately phased demodulating signals possible, bursts of reference phase information having the frequency of the chrominance signal subcarrier are transmitted on the "back-porch" of the horizontal synchronizing pulse which occurs during each retrace interval. These bursts provide an additional function of indicating that a colored television signal is being received. Since this subcarrier reference signal is transmitted merely in bursts, it must be converted to a continuous wave to provide the necessary phase frequency for comparisan with the color signals.

Therefore, it is an object of the invention to provide a new and improved reconstructive circuit for producing a continuous wave from pulses of a wave spaced a predetermined time apart.

A further object of the invention is the provision of a reconstructive circuit for reconstructing the reference continuous wave subcarrier signal in a color television receiver.

Still a further object of the invention is to provide a reconstructive circuit for converting the continuous wave bursts of a color television subcarrier signal into an uninterrupted continuous wave.

Accordingly, the present invention provides a reconstructor circuit which receives bursts of a received television color subcarrier signal and applies these bursts to the input of a delay line. The output of the delay line is so placed as to provide an uninterrupted continuous wave in response to the subcarrier bursts signals to be employed as a reference signal in a color television receiver.

Further objects and advantages of the invention will become apparent as the following description proceeds and features of novelty which characterize the invention will be pointed out in particularity in the claims annexed to and forming a part of this specification. For a better understanding of the invention reference may be had to the accompanying drawings, in which:

Figure 1:
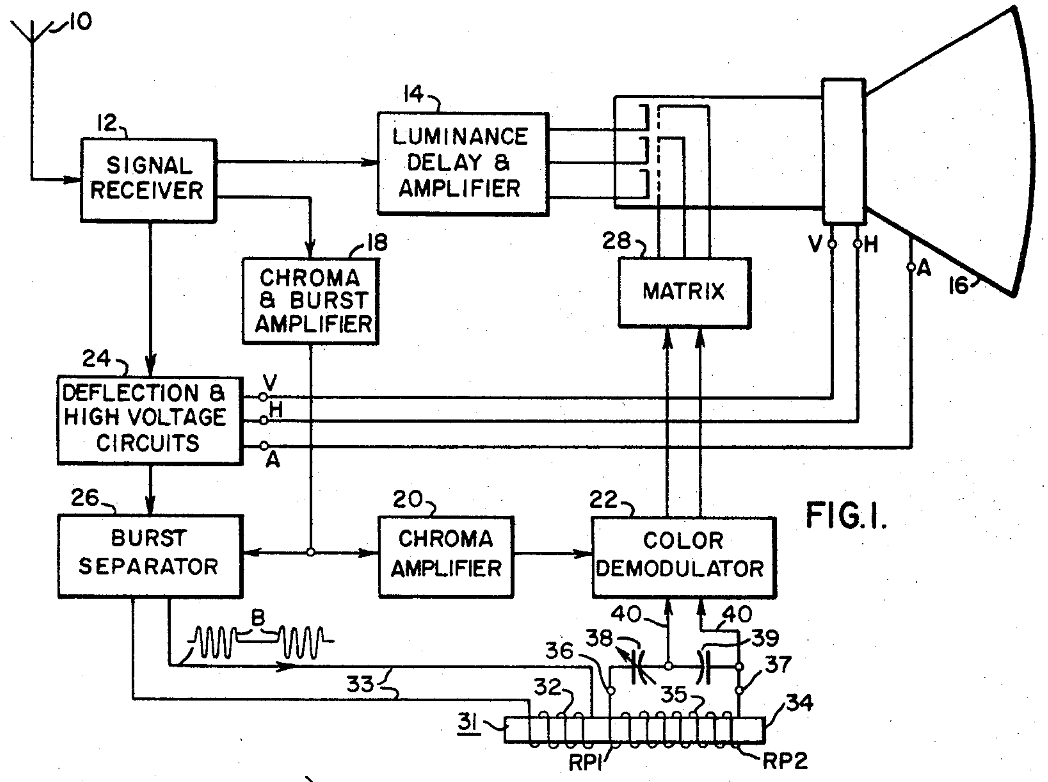
FIGURE 1 illustrates a color television receiver embodying the present invention.

In the embodiment of the invention illustrated in FIG. 1, a color television signal is received by antenna 10 and is applied to a television signal receiver 12, which includes a radio frequency amplifier, a converter, an intermediate frequency amplifier and a second detector. The output from the receiver 12 is applied to an audio detector amplifier whose output is supplied to a loudspeaker. Another output is taken from the receiver stage 12 and applied to a luminance delay and amplifier stage, whose output is connected to the cathode of a color kinescope 16. Still another output from receiver 12 is applied to the deflection and high voltage circuits 24 having a vertical deflection output V, a horizontal deflection output H and a high voltage output A, and all of which are connected to the correspondingly designated terminals of the color kinescope 16. Another output from the receiver 12 is applied through a chroma and burst amplifier 18. One output of which is connected to a chroma amplifier 20. The output of the chroma amplifier 20 is then supplied to a color demodulator 22. Demodulated outputs from the demodulator 22 are applied to a matrix 28. The three color difference signal outputs from the matrix 28 are coupled to the respective ones of the three control grids of the kinescope 16.

Another output from the chroma and burst amplifier 18 is applied to a burst separator 26 to provide the subcarrier burst signals separated from the "back-porch" of the horizontal sync signals. These signals are shown as the waveform B in FIGS. 1 and 2*a*, and are illustrated as having a sinusoidal wave shape. These signals are applied to the input of a magnetostrictive delay line 31. More specifically, the pulses B are applied to a launching coil 32 from the output leads 33 of the burst separator 26. The launching coil 32 is wound about a magnetostrictive element 34 such as nickel as is well known in the art.

The magnetostrictive delay line 31 also includes a pickup coil 35 which is wound about a substantial length of the magnetostrictive element 34. The pickup coil 35 has two output terminals 36 and 37, which are connected in series with a variable capacitor 38 and a capacitor 39. Output leads 40 are connected across the capacitor 39 so as to provide a reconstructed continuous wave to be applied to the color demodulator 22.

Figure 2:
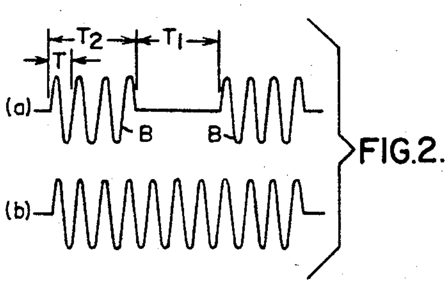
FIG. 2 illustrates a waveform diagram useful in explaining the invention.

The color burst signals, as shown in FIG. 2*a*, have a time period T. The total time length of the color burst B is shown as $T_2$. The time spacing between the color bursts is illustrated in FIG. 2*a* as $T_1$. The burst signals B (see FIG. 1) are applied to the launching coil 32 of the delay line so as to provide shortening and lengthening of the magnetostrictive element 34 in response to these pulses. The signals passing by contraction and expansion of the element 34 will pass from a reference point RP1 at one end of coil 35 to a second reference point RP2 at the other end of coil 35. As shown in FIG. 1, these reference points are coincident with the output terminals 36 and 37 of coil 35. The time that it takes, that is, the delay time, for an initial movement or shock of the element 34, to pass from RP1 to RP2 is a predetermined delay time and is equal to or greater than pulse spacing $T_1$. Thus, the time required for a first burst B to pass from RP1 to RP2 is such that as it leaves the point RP2 a second pulse burst is passing through the reference point RP1. Consequently, there will always be an output signal on the leads 36 and 37 due to the fact that the time delay from RP1 to RP2 is preferably approximately equal to or slightly greater than the pulse spacing time $T_1$ shown in FIG. 2*a*.

The variable capacitor 38 and the capacitor 39 together with the inductance 35 of the pickup coil 35 are chosen to be resonant at the frequency of the color subcarrier. This enables a sine wave output to appear across capacitor 39 such as shown in FIG. 2*b*. The capacitor 39 is preferably quite large so as to minimize the loading of the resonant circuit. A pair of output leads 40 are connected across the capacitor 39 and supply a continuous wave to the color demodulator 22 to provide demodulated color signals on the respective grids of the kinescope 16.

Figure 3:
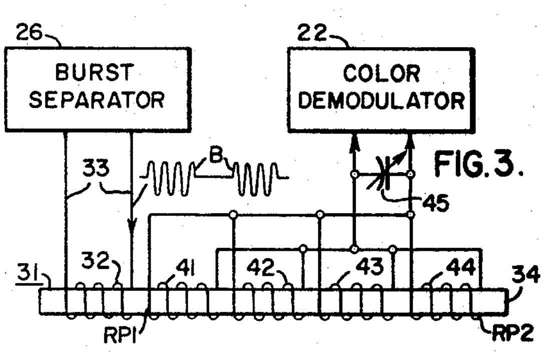
FIG. 3 illustrates another embodiment of the present invention.

As stated above the pickup coil 35 covers the distance from the reference point RP1 to reference point RP2 which represents a corresponding delay that is at least equal to the spaced time period $T_1$ between the burst pulses B. The pickup coil 35 comprises a single winding as shown in FIG. 1. Similar results can be produced by employing a plurality of pickup coils 41, 42, 43 and 44 as shown in FIG. 3 between the first reference point RP1 and the second reference point RP2. Rather than connecting the coils in series they can be connected in parallel, as shown in FIG. 3, to provide an output which is a continuous wave signal. The pickup coils 41 through 44 can be positioned so that the phasing between the outputs of these pickup coils is in phase, and they are all connected in parallel with a variable capacitor 45. The paralllel connnection of the pickup coils 41 through 44 is made resonant with the capacitor 45 at the subcarrier frequency of the color burst B.

Figure 4:
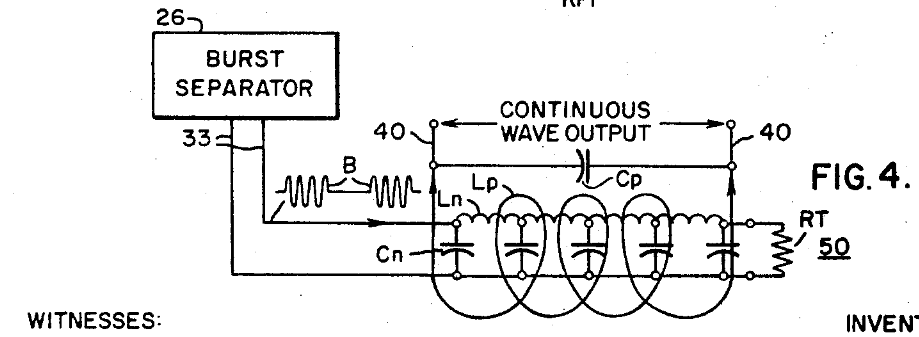
FIG. 4 illustrates an electromagnetic type of delay line as used herein.

In FIG. 4, an electromagnetic delay line 50 is shown replacing the magnetostrictive one of FIGS. 1 and 3. The delay line includes a distributed LC network including inductive and capacitive elements L*n* and C*n*, respectively. A pickup coil L*p* is disposed about the distributed network and is magnetically coupled to the inductive element L*n* of the network. A capacitor C*p* is connected across the pickup coil L*p*, with L*p* and C*p* being tuned to the subcarrier frequency.

The burst signal B is fed into the delay line 50 which is terminated in its characteristic impedance RT. The delay time of the delay line 50 is equal to $T_1$ or $T_1+NT$, where N is a whole number. The energy corresponding to the subcarrier frequency is thus in the delay line and magnetically coupled to the pickup coil L*p* continuously. Therefore, a continuous wave is induced in L*p* and the output of the pickup coil L*p* can be fed to a color demodulator from the conductors 40.

As a further advantage of the present reconstructor circuitry it should be noted conventional color television receivers employ phase detectors to control the frequency and phase of a reactance controlled oscillator to reconstruct a subcarrier for providing a continuous wave of subcarrier frequency. Color killler circuitry is also employed to disable the choma circuits in the absence of burst signals. The present reconstruct circuitry for reconstructing the subcarriers using delay lines could advantageously replace the usual phase detector, reactance amplifier, oscillator and color killer circuits conventionally utilized.

While the present invention is shown in several forms it will be obvious to those skilled in the art that it is not so limited to those forms but is susceptible to various changes and modifications without departing from the spirt and scope of the invention.

I claim as my invention:

1. In a television receiver a reconstructive circuit for producing a continuous wave to be applied to a color demodulator of said receiver from color burst signals being spaced apart at time period $T_1$ comprising: a delay line, means for applying said color burst signals to said delay line to travel down said delay line from a first reference point to a second reference point in a predetermined time period $T_2$, said time period $T_2$ being at least equal to said time period $T_1$, a first output terminal coupled to said first reference point and a second output terminal coupled to said second reference point, said continuous wave being developed across said first and second output terminals.

2. In a television receiver a reconstructive circuit for producing a continuous wave to be applied to a color demodulator of said receiver from color burst signals being spaced apart a time period $T_1$, said continuous wave having a period T, said circuit comprising: a delay line, means for applying said color burst signals to said delay line to travel down said delay line from a first reference point to a second reference point in a predetermined travel time period, said travel time period being at least as long as time period $T_1$, and a resonant circuit including an inductor and a capacitor coupled between said first and second reference points and resonant at a frequency of $1/T$; said continuous wave being developed across said first and second reference points.

3. In a television receiver a reconstructive circuit for producing a continuous wave to be applied to a color demodulator of said receiver from color burst signals being spaced apart a time period $T_1$ comprising, a magnetostrictive delay line including a launching coil and a pickup coil, means for applying said color burst signals to said launching coil for traveling down a predetermined distance associated with said pickup coil in a predetermined time travel period, said time travel period being at least as long as said time period $T_1$, and output terminals connected to said pickup coil means, said continuous wave being developed at said output terminals.

4. In a television receiver a reconstructive circuit for producing a continuous wave to be applied to a color demodulator of said receiver from color burst signals being spaced apart at time period $T_1$ comprising: a magnetostrictive delay line including a launching coil and a pickup coil, means for applying said color burst signals to said launching coil, means to induce a traveling vibration in said pickup coil from a first reference point on said pickup coil to a second reference point on said pickup coil in a predetermined travel time period, said travel time period being at least equal to said time period $T_1$, and output terminals connected to said pickup coil means, said continuous wave being developed at said output terminals.

5. In a television receiver a reconstruct circuit for producing a continuous wave to be applied to a color demodulator of said receiver from color burst signals being spaced apart at time period $T_1$, said continuous wave having a period of T, said circuit comprising: a magnetostrictive delay line including a magnetostrictive element, a launching coil coupled to said magnetostrictive element to apply impulses thereto in response to current through said launching coil, means for applying said color burst signals to said launching coil, a pickup coil wound about said magnetostrictive element from a first reference point to a second reference point for sensing vibrations therebetween, said magnetostrictive element providing a delay time between said first reference point and said second reference point, said delay time being substantially as long as said time period $T_1$, said continuous wave being developed across said first and second reference points.

6. In a television receiver a reconstructive circuit for producing a continuous wave to be applied to a color demodulator of said receiver from color burst signals being spaced at time period $T_1$ apart, said continuous wave having a period T, said circuit comprising: a magnetostrictive delay line including a magnetostrictive element, a launching coil operatively connected to said magnetostrictive element, a pickup coil disposed about said magnetostrictive element for picking up vibrations of said magnetostrictive element from a first reference point to a second reference point, means for applying said color burst signals to said launching coil, the delay time between said first reference point and said second reference point being a time period at least equal to said time period $T_1$, and capacitance means connected to said pickup coil and being resonant therewith at a frequency equal to $1/T$, said continuous wave being developed across said first and second reference points.

7. In a television receiver a reconstructive circuit for producing a continuous wave to be applied to a color demodulator of said receiver from color burst signals being spaced apart a time period $T_1$, said circuit comprising: an electromagnetic delay line including an LC network and a pickup coil inductively coupled thereto, means for applying said color burst signals to said LC network, said pulses traveling a predetermined distance along said pickup coil in a predetermined time travel period, said time travel period being at least or as long as said time period $T_1$, and output terminals connected to said pickup coil means, said continuous wave being developed at said output terminals.

8. In a television receiver a reconstructive circuit for producing a continuous wave to be applied to a color demodulator of said receiver from color burst signals being spaced apart a time period $T_1$, said circuit comprising: an electromagnetic delay line including a distributed LC network and a pickup coil, means inductively coupled thereto for applying said color burst signals to said LC network, a continuous waveform being induced across said pickup coil from a first reference point on said pickup coil to a second reference point on said pickup coil in a predetermined travel time period, said travel time period being at least equal to said time period $T_1$, and a capacitor connected across said pickup coil forming a tuned circuit therewith having a resonant frequency substantially equal to that of the continuous wave, said continuous wave being developed across said first and second reference points.

9. In a television receiver a reconstructive circuit for producing a continuous wave to be applied to a color demodulator of said receiver from color burst signals being spaced at time period $T_1$ apart, said continuous wave having a period T, said circuit comprising a magnetostrictive delay line including a magnetostrictive element, a launching coil operatively connected to said magnetostrictive element, a plurality of pickup coils operatively connected in parallel disposed about said magnetostrictive element for picking up vibrations of said magnetostrictive element from a first reference point to a second reference point, means for applying said color burst signals to said launching coil, the delay time between said first reference point and said second reference point being a time period at least equal to said time period $T_1$, and capacitance means connected across said pickup coils and being resonant therewith at a frequency equal to $1/T$, said continuous wave being developed across said first and second reference points.

References Cited

UNITED STATES PATENTS

| | | | |
|---|---|---|---|
| 2,721,265 | 10/1955 | Rothman et al. | 328—27 |
| 2,875,272 | 2/1959 | Cuccia | 178—69.5 |
| 2,717,981 | 9/1955 | Apstein | 333—30 |
| 2,815,490 | 12/1957 | De Faymoreau | 333—30 |
| 2,863,120 | 12/1958 | Powell | 332—9 |
| 3,138,219 | 6/1964 | Blizard | 181—.5 |
| 3,156,896 | 10/1964 | Martin | 340—167 |
| 3,321,738 | 5/1967 | Trott | 340—10 |

ROBERT L. GRIFFIN, *Primary Examiner.*

R. MURRAY, *Assistant Examiner.*